United States Patent
Kothari et al.

(10) Patent No.: US 12,145,319 B2
(45) Date of Patent: Nov. 19, 2024

(54) TEMPERATURE PREDICTION IN THREE-DIMENSIONAL (3D) PARTS

(71) Applicant: Hewlett-Packard Development Company, L.P., Spring, TX (US)

(72) Inventors: Sunil Kothari, Palo Alto, CA (US); Tod Heiles, Sumner, WA (US); Juan Carlos Catana Salazar, Guadalajara (MX); Jun Zeng, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 538 days.

(21) Appl. No.: 17/420,029

(22) PCT Filed: Jan. 23, 2019

(86) PCT No.: PCT/US2019/014715
§ 371 (c)(1),
(2) Date: Jun. 30, 2021

(87) PCT Pub. No.: WO2020/153950
PCT Pub. Date: Jul. 30, 2020

(65) Prior Publication Data
US 2022/0088879 A1    Mar. 24, 2022

(51) Int. Cl.
B29C 64/393    (2017.01)
B29C 64/165    (2017.01)
B29C 64/188    (2017.01)
B33Y 30/00     (2015.01)
B33Y 40/20     (2020.01)
(Continued)

(52) U.S. Cl.
CPC .......... *B29C 64/393* (2017.08); *B29C 64/165* (2017.08); *B29C 64/188* (2017.08); *B33Y 40/20* (2020.01); *B33Y 50/02* (2014.12); *G06N 3/08* (2013.01); *B33Y 30/00* (2014.12)

(58) Field of Classification Search
None
See application file for complete search history.

(56) References Cited

U.S. PATENT DOCUMENTS

| 9,931,697 B2 | 4/2018 | Levin et al. |
| 2016/0246908 A1 | 8/2016 | Louis et al. |
| 2017/0056970 A1 | 3/2017 | Chin et al. |

(Continued)

FOREIGN PATENT DOCUMENTS

| WO | WO-2017186278 A1 * | 11/2017 | ........... B29C 64/165 |
| WO | WO-2018140034 A1 | 8/2018 | |
| WO | WO-2018194623 A1 | 10/2018 | |

OTHER PUBLICATIONS

Nardi, "Temperature Controlled Fan Keeps Printer Cool", Sep. 2018, https://hackaday.com/2018/09/11/temperature-controlled-fan-keeps-printer-cool/, pp. 1 (Year: 2018).*

*Primary Examiner* — David Earl Ogg
(74) *Attorney, Agent, or Firm* — Shook, Hardy & Bacon L.L.P.

(57) ABSTRACT

Systems and methods of predicting temperature during a build of a three-dimensional (3D) part include determining a temperature profile at a plurality of layers of a part based on geometric characteristics of the 3D part as defined by a 3D part file, and adjusting a process parameter of the build based on the determined temperature.

13 Claims, 10 Drawing Sheets

(51) Int. Cl.
*B33Y 50/02* (2015.01)
*G06N 3/08* (2023.01)

(56) References Cited

U.S. PATENT DOCUMENTS

| | | |
|---|---|---|
| 2017/0087767 A1* | 3/2017 | Grewell ................ B29C 64/118 |
| 2017/0151722 A1 | 6/2017 | Prasad et al. |
| 2017/0239719 A1* | 8/2017 | Buller ..................... B22F 12/49 |
| 2018/0017956 A1* | 1/2018 | Garcia Reyero Vinas .................. B29C 64/386 |
| 2018/0095450 A1 | 4/2018 | Lappas |
| 2018/0104897 A1 | 4/2018 | Novick |
| 2018/0111320 A1 | 4/2018 | Zhao et al. |
| 2018/0141123 A1 | 5/2018 | Revanur et al. |
| 2018/0250774 A1 | 9/2018 | Symeonidis |
| 2019/0004079 A1* | 1/2019 | Blom ..................... B33Y 50/02 |
| 2019/0004496 A1* | 1/2019 | Blom ..................... G01B 11/02 |

\* cited by examiner

TEMPERATURE PREDICTION IN THREE-DIMENSIONAL (3D) PARTS

BACKGROUND

Three-dimensional (3D) printing is dramatically changing the manufacturing landscape. Via 3D printing, articles and components may be manufactured without the resources of a factory or other large-scale production facility. Additive manufacturing systems produce three-dimensional (3D) objects by building up layers of material and combining those layers using adhesives, heat, chemical reactions, and other coupling processes. Some additive manufacturing systems may be referred to as "3D printing devices." The additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
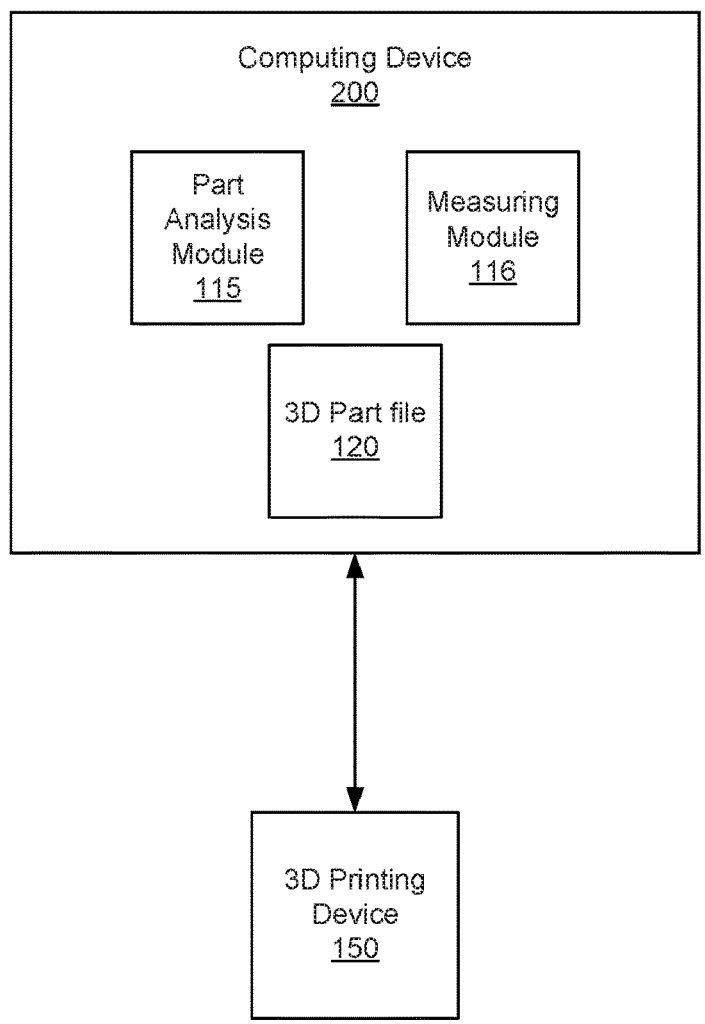
FIG. 1 is a block diagram of a system for predicting temperature during a build of a three-dimensional (3D) part, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A part printed by a 3D printing device may include both cosmetic and mechanical properties. These cosmetic and mechanical properties may be affected by the process parameters used during the build processes of the part that may cause these cosmetic and mechanical properties to lack uniformity, not be proximate to an intended cosmetic and/or mechanical property, and combinations thereof. The lack of uniformity and/or the possibility that the intended cosmetic and/or mechanical properties are not proximate to the intended property causes defects in the part.

In one example, the defects may be caused by temperatures within the layers that are individually formed during the build of the part, the part's orientation within a building zone of the 3D printing device, and the geometrical properties of the part such as symmetry. The ability to automatically compute temperatures that may be experienced during the building of the part may prove useful in determining whether the part is likely to have a defect or otherwise lack of uniformity and/or not be proximate to the intended cosmetic and/or mechanical properties.

Further, post-processing of the parts may not be permissible until after the parts are built and have sufficiently cooled. The temperatures within the layers and within the part as a whole may useful in determining when the parts will cool enough. Post-processing of the parts may include, for example, sanding, sand blasting, milling, tumbling, varnishing, dyeing, cutting, melting, other post-printing processes, or combinations thereof. If the parts are not cooled to a predetermined temperature, the post-processing may cause the cosmetic and/or mechanical properties and characteristics of the parts to diminish, fail, or otherwise not meet a user-specified or user-expected level of part quality.

Data defining a build of the part or parts within a print job may be analyzed before the build process begins to determine if these print defects may be present in a printed part. The build data defining the build of the parts may include any 3D printing file format such as a 3D manufacturing format (3MF) file format, stereolithography (STL) file format, additive manufacturing format (AMF) file format, Wavefront Object (OBJ) file format, virtual reality modeling language (VRML) file format, X3D XML-based file format, Filmbox (FBX) file format, initial graphics exchange specification (IGES) file format, ISO 10303 (STEP) file format, point cloud data from a 3D scan of an object, other types of 3D printing file formats, and combinations thereof. This data may prove helpful in preemptively determining temperatures reached at the layers of the part, and an overall temperature of the part. This information may be used to determine a success rate of a part before the part is even built using the 3D printing device.

The build data defining the build of the parts may be included within a batch which includes similar parts. Any approximations of how high the temperature might be or may have reached in a previous build of the part from a higher print zone-level metric may assist in diagnosing processing issues and part defects in the parts. This information may be used to compute the amount of printing agents such as active ingredients, detailing agent (DA), fusing agents, binding agents, sintering agents, other printing agents, and combinations thereof, that may be used to compensate for a rise in temperature among the layers of the part being printed. This may be particularly helpful in situations where access to thermal and/or visual images of the actual printed part are not available. The printing agents serve as a liquid solution and specifically include a detailing agent that may be selectively applied onto a powder layer where fusing or sintering of the powder material is to be reduced, prevented, or otherwise inhibited or altered.

The detailing agent may include cooling agents and defusing agents, that serve to create a more definite separation between the powder material that is to be fused or sintered to form the layers of the part and the remainder of the powder material that surrounds the finished parts within the build. In an example, a liquid solution comprising a mixture of detailing agent and an active ingredient may be selectively applied onto the powder layer. A liquid solution comprising a mixture of one or multiple active ingredients (AI) as solute within a detailing agent (DA) as the solvent, may be applied. The terms "fusing," "fuse," "fused," and similar language indicate heating particles of the powder material to a level that involves fulling melting the particles to achieve solidification of the particles as a homogeneous part.

The terms "sintering", "sinter", "sintered", and similar language indicate heating particles of the powder material to a level that does not involve fulling melting the particles, but instead involves heating the particles of powder material to the point that the powder can fuse together on a molecular level. Thus, sintering enables control over the porosity of the material. However, because sintering involves a level of fusing particles together, the terms "fusing", "fuse", "fused", may, at times, be used interchangeably with the terms "sintering", "sinter", "sintered", depending on the context of the description. Depending on the description, "fusing" may be used to indicate the solidification of particles of powder material that have not actually been fully melted, but instead have been partially melted. For example, a detailing agent may be deposited to reduce the fusing of particles within a particular area of powdered material in order to create porosity. In another example, an amount of fusing energy may be controlled, for example, reduced to a degree that particles of powdered material are partially melted rather than fully melted. Such actions may alternately be described as sintering, partial fusing, reduced fusing, and so on.

Examples described herein provide part-temperature prediction systems and associated methods to determine temperature of the part at each layer of the part based on the determined geometric characteristics and attributes such as, for example, the part's orientation, symmetry, job data, process parameters and other data using higher-level inputs such as black/white (B/W) ratio, bounding perimeter ratio, and other metrics from a batch of similar parts for detailing agent (DA) compensation, irradiation, heat spread in X-direction, and combinations thereof. The methods use a prediction model from one 3D printing device to predict temperature of the same part on another 3D printing device in order to allow for an efficient method of job scheduling and to provide uniformity in an expected outcome of the parts between 3D printing devices. Further, in one example, the methods may selectively lock and/or allow access to objects and areas of a print zone of the 3D printing device, where metrics are computed by segmenting the volume of the print zone. This enables a user to select the metric and preview the results on a sample part. Therefore, the examples described herein automatically compute the temperature for a batch, which includes similar parts in order to diagnose process parameters and part defects within the part. Further, the examples described herein automatically compute the temperature for a batch in order to determine when the parts will sufficiently cool to allow for post-processing to begin.

Examples described herein provide a method of predicting temperature during a build of a three-dimensional (3D) part. The method may include determining a temperature profile at a plurality of layers of a part based on geometric characteristics of the 3D part as defined by a 3D part file, and adjusting a process parameter of the build based on the determined temperature.

The temperature of the layers of the part are determined by executing a black-and-white (B/W) ratio analysis, a bounding perimeter ratio analysis, or combinations thereof. The method may also include scheduling post-build processes based on the determined temperatures. Adjusting the process parameter of the build comprises adjusting an amount of detail agent dispensed during the build, adjusting a speed of material deposition, adjusting a speed of irradiation of a build material, adjusting the intensity of irradiation of the build material, adjusting an amount of heat provided to the build material, and combinations thereof. Further, the method may also include executing a neural network to learn a temperature profile of a plurality of previously-printed 3D parts based on the geometric characteristics of the previously-printed 3D parts, and predict a new temperature profile for the 3D part based at least in part on the learned temperature profiles of the previously-printed 3D parts. The method may also include restricting access to a volume of a print area of a 3D printing device where the temperature may be determined.

Examples described herein may also provide a non-transitory computer readable medium comprising computer usable program code embodied therewith, the computer usable program code to, when executed by a processor, determine a temperature profile at a plurality of layers of a part based on geometric characteristics of the 3D part as defined by a 3D part file, adjust a process parameter of the build based on the determined temperature, and print the part using the adjusted process parameter.

The computer readable medium may also include computer usable program code to, when executed by the processor, schedule post-build processes based on the determined temperatures. Further, the computer readable medium may include computer usable program code to, when executed by the processor, execute a neural network to learn a temperature profile of the 3D part, predict a new temperature profile for a new 3D part, and print the part using the new temperature profile. Still further, the computer readable medium may include computer usable program code to, when executed by the processor, include a set of diagnostic parts in a build along with the 3D part.

Examples described herein may also provide a system for predicting temperature during a build of a three-dimensional (3D) part. The system may include a part analysis module to determine a number of geometric characteristics of a 3D part based on data within a 3D part file, and a measuring module to determine a temperature profile at a plurality of layers of the part based on the geometric characteristics of the 3D part.

The system may also include a neural network to learn the temperature profiles of a plurality of different 3D parts, and predict a new temperature profile for a new 3D part. The measuring module may use a black-and-white (B/W) ratio analysis, a bounding perimeter ratio analysis, and combinations thereof. The measuring module may determine a temperature profile based on location of the part with in a print area of a 3D printing device. The system may also include a detailing agent (DA) module to determine an amount of DA to apply during a build of the 3D part based on the determined temperature, and an adjustment module to adjust a process parameter of the build based on the determined temperature.

Examples provided herein include apparatuses, processes, and methods for generating three-dimensional (3D) objects.

Apparatuses for generating three-dimensional objects may be referred to as additive manufacturing apparatuses. Example apparatuses described herein may correspond to three-dimensional printing systems, which may also be referred to as 3D printing devices or 3D printers. In an example of an additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where powder-based build material may include wet and/or dry powder-based materials, particulate materials, and/or granular materials. In some examples, the build material may be a weak light absorbing polymer. In some examples, the build material may be a thermoplastic. Furthermore, as described herein, agent may include fluids that may facilitate fusing of build material when energy is applied. In some examples, the agent may be referred to as coalescing or fusing agent. In some examples, agent may be a light absorbing liquid, an infrared or near infrared absorbing liquid, such as a pigment colorant. In some examples at least two types of agent may be selectively distributed on a build layer. In some examples at least one agent may inhibit fusing of build material when energy is applied.

Example apparatuses may include an agent distributor. In some examples, an agent distributor may include at least one fluid ejection device. A fluid ejection device may include at least one printhead such as, for example, a thermal ejection based printhead, a piezoelectric ejection based printhead, other fluid ejection devices, or combinations thereof. An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may include other types of fluid ejection devices that selectively eject small volumes of fluid.

In some examples, an agent distributor may include at least one fluid ejection device that includes a plurality of fluid ejection dies arranged generally end-to-end along a width of the agent distributor. In some examples, the at least one fluid ejection device may include a plurality of printheads arranged generally end-to-end along a width of the agent distributor. In such examples, a width of the agent distributor may correspond to a dimension of a build area. For example, a width of the agent distributor may correspond to a width of a build area. An agent distributor may selectively distribute agent on a build layer in the build area concurrent with movement of the scanning carriage over the build area. In some example apparatuses, the agent distributor may include nozzles including nozzle orifices through which agent may be selectively ejected. In such examples, the agent distributor may include a nozzle surface in which a plurality of nozzle orifices may be formed.

In some examples, apparatuses may include a build material distributor to distribute build material in the build area. A build material distributor may include, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

The terms "built" and "printed" are used exchangeably herein to denote the formation of the part using a 3D printing system.

Turning now to the figures, FIG. 1 is a block diagram of a system (100) for predicting temperature during a build of a three-dimensional (3D) part, according to an example of the principles described herein. Although the computing device (200) of the system (100) is depicted in FIG. 1 as being separate from a 3D printing device (150), in one example, the computing device (200) and the 3D printing device (150) may be integrated into a single device.

The system (100) may include a part analysis module (115). The part analysis module (115), when executed by a data processing device, determines a number of geometric characteristics of a 3D part based on data within a 3D part file (120). The geometric characteristics are used to determine the temperatures of the layers of the part and the part as a whole during and after the building of the part using the 3D printing device (150). Any approximations of how high temperatures may be or may have reached during the build from a higher-level metric such as a B/W ratio or bounding perimeter ratio, and other metrics may serve in diagnosing process and/or part defects and to compute the amount of printing agent compensations used during the building of the part. These diagnoses may be helpful when a user or 3D printing service provider does not have access to the part's actual thermal images and associated analysis or visual images obtained during and after a build of the part. The geometric characteristics may include, for example, the size of the part, the shape of the part, the symmetry of the part, the orientation of the part along the x-, y-, and z-axis of a print zone of the 3D printing device (150), the arrangement of a number of parts within the print zone, other geometric attributes for the part, and combinations thereof.

The system (100) may also include a measuring module (116) to determine a temperature profile at a plurality of layers of the part based on the geometric characteristics of the 3D part. The measuring module (116) employs the B/W ratio, the bounding perimeter ratio, and other high-level metrics to measure these temperatures based on the 3D part file (120), the geometric characteristics of the 3D part, and the high-level metrics. Once a temperature profile of the part is determined from the part analysis module (115) and the measuring module (116), the system (100) may adjust at least one process parameter of the build to reduce or eliminate any possibility of print defects and compute an amount of printing agent to apply during the build of the part.

Figure 2:
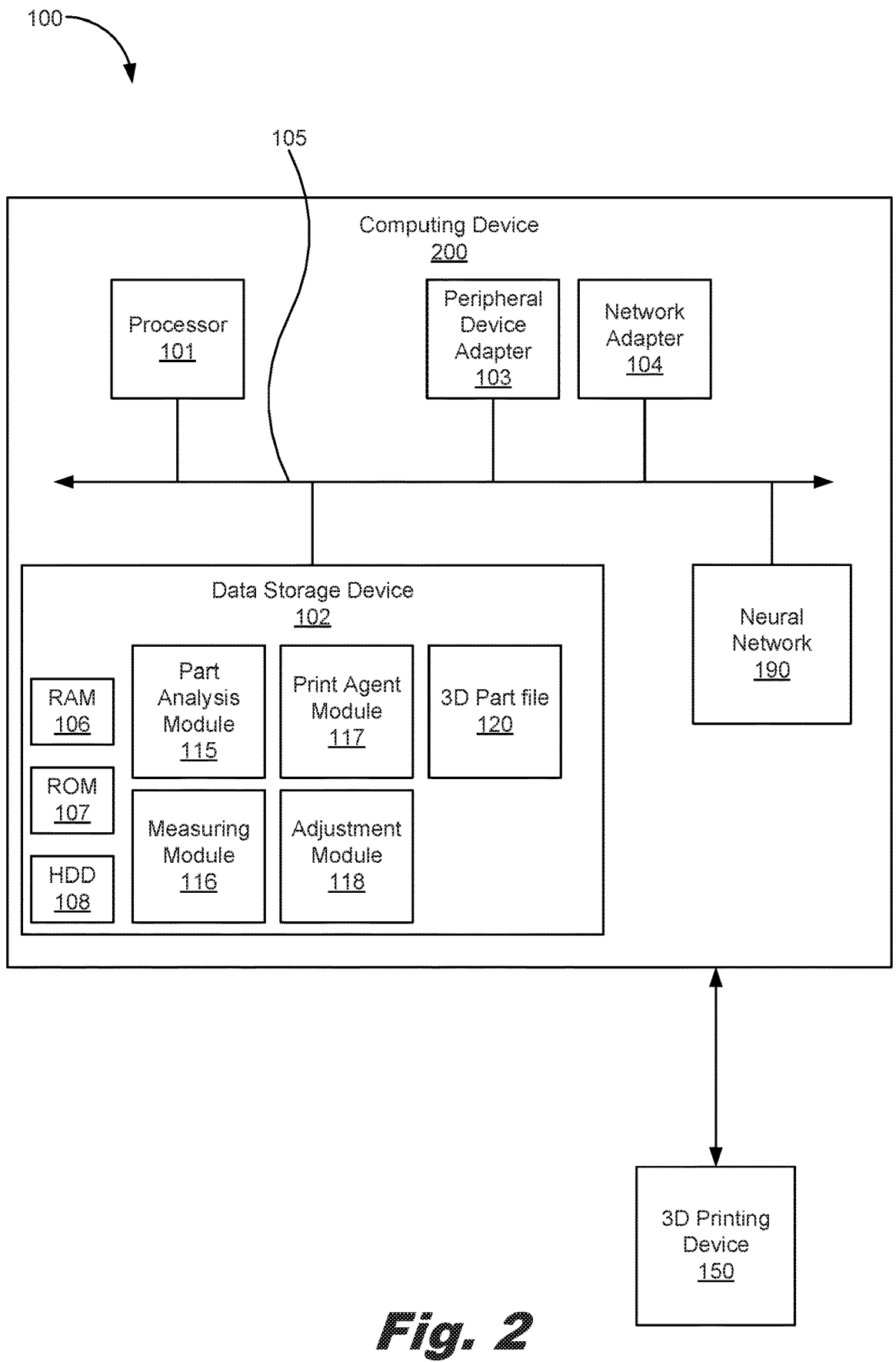
FIG. 2 is a block diagram of a system for predicting temperature during a build of a three-dimensional (3D) part, according to an example of the principles described herein.

FIG. 2 is a block diagram of a system (100) for predicting temperature during a build of a three-dimensional (3D) part, according to an example of the principles described herein. Again, although the computing device (200) of the system (100) is depicted in FIG. 2 as being separate from a 3D printing device (150), in one example, the computing device (200) and the 3D printing device (150) may be integrated into a single device. The computing device (200) may be implemented in an electronic device. Examples of electronic devices include servers, desktop computers, laptop computers, personal digital assistants (PDAs), mobile devices, smartphones, gaming systems, and tablets, among other electronic devices.

The computing device (200) may be utilized in any data processing scenario including, stand-alone hardware, mobile applications, through a computing network, or combinations thereof. Further, the computing device (200) may be used in a computing network, a public cloud network, a private cloud network, a hybrid cloud network, other forms of networks, or combinations thereof. In one example, the methods provided by the computing device (200) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (200) are executed by a local administrator.

To achieve its desired functionality, the computing device (200) includes various hardware components. Among these hardware components may be a processor (101), a data storage device (102), a peripheral device adapter (103), a network adapter (104), and a neural network (190). These hardware components may be interconnected through the use of a number of busses and/or network connections such as via a bus (105).

The processor (101) may include the hardware architecture to retrieve executable code from the data storage device (102) and execute the executable code. The executable code may, when executed by the processor (101), cause the processor (101) to implement at least the functionality of determining a temperature profile at a plurality of layers of a part based on geometric characteristics of the 3D part as defined by a 3D part file, adjusting a process parameter of the build based on the determined temperature, and print the part using the adjusted process parameter. Further, the executable code may, when executed by the processor (101), cause the processor (101) to implement at least the functionality of executing a black/white (B/W) ratio analysis, a bounding perimeter ratio analysis, or combinations thereof to determine the temperature profile. Still further, the executable code may, when executed by the processor (101), cause the processor (101) to implement at least the functionality of scheduling post-build processes based on the determined temperatures. Further, the executable code may, when executed by the processor (101), cause the processor (101) to implement at least the functionality of adjusting an amount of detail agent dispensed during the build, adjusting a speed of material deposition, adjusting a speed of irradiation of a build material, adjusting the intensity of irradiation of the build material, adjusting an amount of heat provided to the build material, or combinations thereof. Even still further, the executable code may, when executed by the processor (101), cause the processor (101) to implement at least the functionality of learning a temperature profile of a plurality of previously-printed 3D parts based on the geometric characteristics of the previously-printed 3D parts, and predicting a new temperature profile for the 3D part based at least in part on the learned temperature profiles of the previously-printed 3D parts. Further, the executable code may, when executed by the processor (101), cause the processor (101) to implement at least the functionality of restricting access to a volume of a print area of a 3D printing device where the temperature may be determined. These and other functionalities are according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the computing device (200) enable the processor (101) to interface with various other hardware elements, external and internal to the computing device (200). For example, the peripheral device adapters (103) may provide an interface to input/output devices, such as, for example, a display device, a mouse, or a keyboard. The peripheral device adapters (103) may also provide access to other external devices such as an external storage device, a number of network devices such as, for example, servers, switches, and routers, client devices, other types of computing devices, and combinations thereof. The peripheral device adapters (103) may also create an interface between the processor (101) and the display device, a printer, or other media output devices. The network adapter (104) may provide an interface to other computing devices within, for example, a network, thereby enabling the transmission of data between the computing device (200) and other devices located within the network.

The computing device (200) further includes a number of modules used in the implementation of the functionality of the processor (101) and the methods described herein. The various modules within the computing device (200) include executable program code that may be executed separately. In this example, the various modules may be stored as separate computer program products. In another example, the various modules within the computing device (200) may be combined within a number of computer program products; each computer program product including a number of the modules.

The computing device (200) may include the part analysis module (115) and measuring module (116) described herein. The part analysis module (115) may also restrict access to a volume of a print area or print zone of the 3D printing device (150) where the temperature of the layers of the part and the part as a whole is being determined. In this example, the part may be undergoing a build or may have completed a build, but the computing device (200) may be requesting metrics from the 3D printing device regarding the temperatures of the part. In this situation, it may be disadvantageous to allow a user to gain access to the print zone of the 3D printing device (150) where the build is taking place. Thus, the part analysis module (115) may lock a user out of access to the at least a portion of the print zone in order for those metrics to be obtained. Restricting access to the print zone of the 3D printing device (150) may include locking a housing that surrounds the print zone of the 3D printing device (150), providing instructions to a user via, for example, a GUI presented on the computing device (200) and/or the 3D printing device (150) not to access the print zone, segmenting the print zone by placing a physical divider within the print zone to divide access to some parts that are not being analyzed and not to other parts that are being analyzed, other methods of restricting access to at least a portion of the print zone, and combinations thereof.

Figure 7:
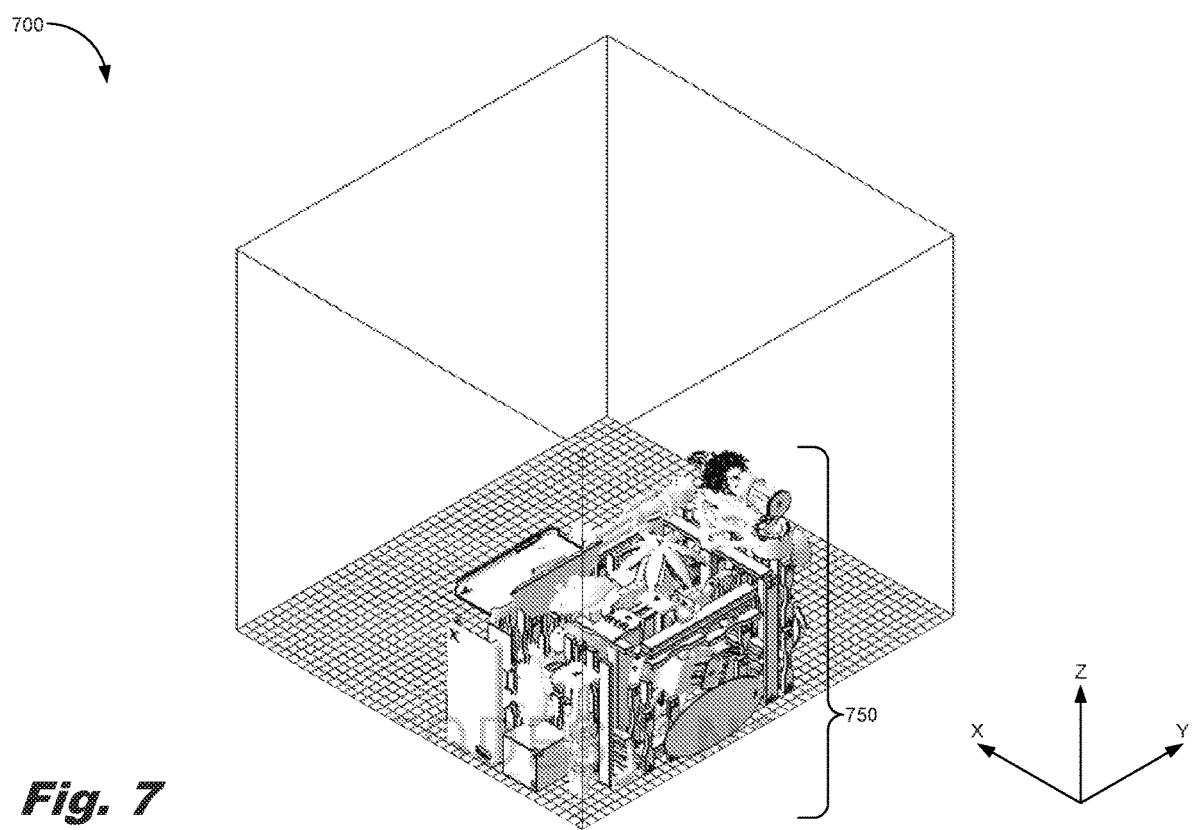
FIG. 7 is a perspective view of a build zone of a 3D printing device including a number of parts, according to an example of the principles described herein.
Figure 8:
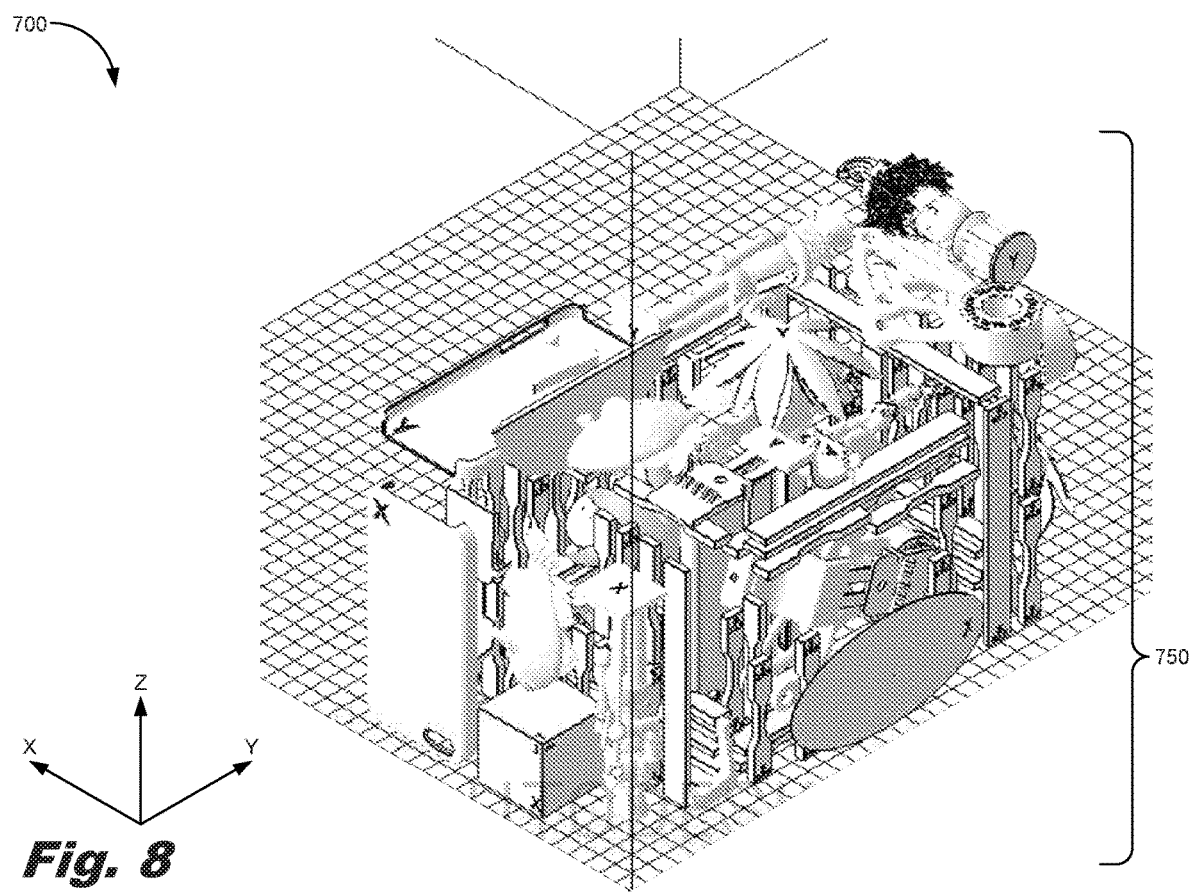
FIG. 8 is a perspective view of the build zone of a 3D printing device including a number of parts of FIG. 7, according to an example of the principles described herein.
Figure 9:
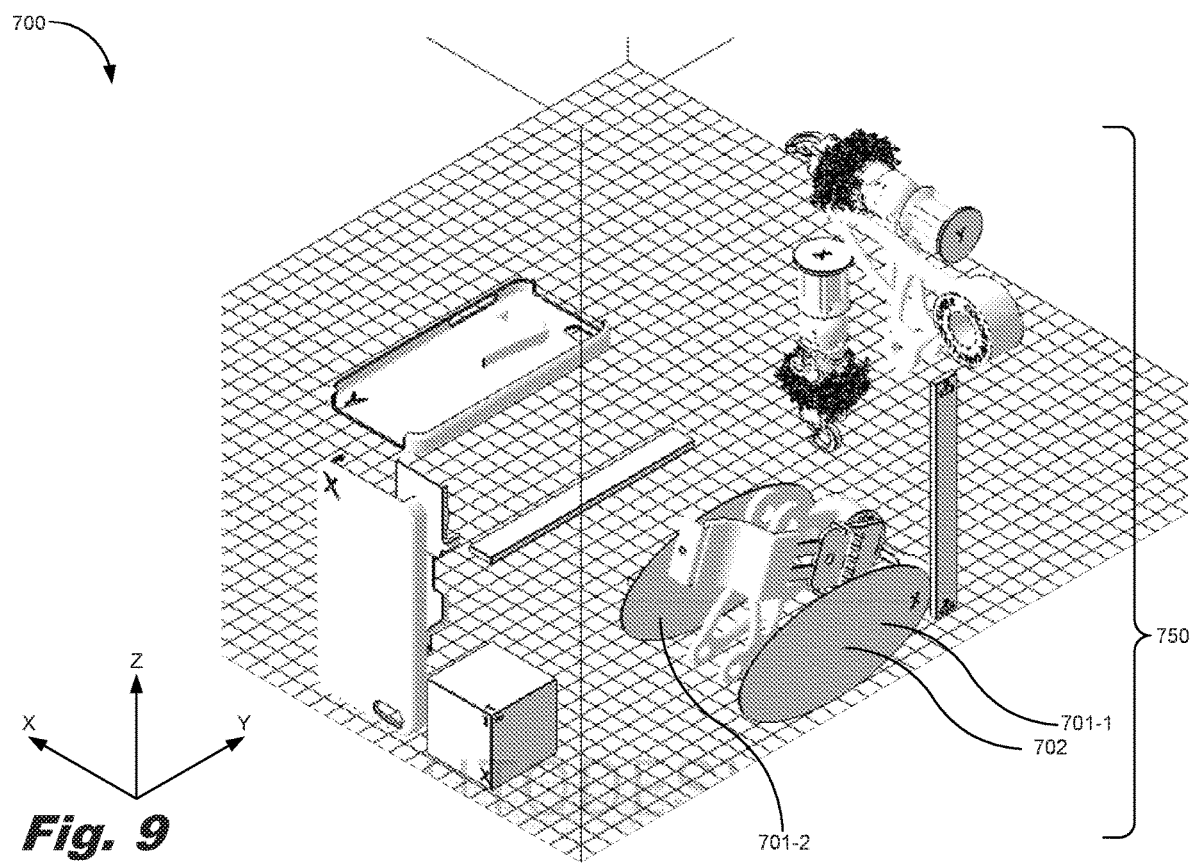
FIG. 9 is a perspective view of the build zone of a 3D printing device with a number of the parts depicted in FIG. 7 removed, according to an example of the principles described herein.

The measuring module (116) may determine a temperature profile at a plurality of layers of the part by employing the B/W ratio, the bounding perimeter ratio, or another high-level metric to measure the temperatures of the part based on the 3D part file (120), the geometric characteristics of the 3D part, and the high-level metrics. B/W ratio analysis may include selecting parts that are to be printed that are also symmetrical in the x-, y-, and z-axis. FIG. 7 is a perspective view of a build zone (700) of a 3D printing device (150) including a number of parts (750), according to an example of the principles described herein. FIG. 8 is a perspective view of the build zone (700) of the 3D printing device (150) including the number of parts (750) of FIG. 7, according to an example of the principles described herein. FIG. 8 is a close-up view of the parts (750). Further, FIG. 9 is a perspective view of the build zone (700) of the 3D printing device (150) with a number of the parts (750) depicted in FIG. 7 removed, according to an example of the principles described herein. Of the parts (750) remaining in FIG. 9, two identical discs (701-1, 701-2) are included in the number of parts (750) that are to be printed. The first disc (701-1) is marked with an "x" to distinguish it from the second disc (701-2). The parts depicted in FIGS. 7 through 9 are packed within the build zone (700) so as to minimize distances between the parts and maximize the number of parts that may be included within a build (i.e., a print job). The discs (701-1, 701-2) may be a part the user is seeking to print, or may be a reference part used to identify how build materials, printing agents, and process parameters interact within one another within a build.

The discs (701-1, 701-2) are symmetrical in the x-, y-, and z-axis meaning that the discs (701-1, 701-2) includes a line going through them which divides it into two pieces in each of the x-, y-, and z-axis which are mirror images of each other. These discs (701-1, 701-2) may serve as candidates under the B/W ratio analysis. The B/W ratio analysis may include selecting a region of interest (ROI) (702) such as, for example, the center of the first disc (701-1). The ROI (702) may include, for example, two pixels (e.g., voxels) located at the center of the first disc (701-1). These two pixels are extracted from the 3D part file (120).

In the example of FIGS. 7 through 9, the discs (701-1, 701-2) share the same start and end layer where the printing of the discs (701-1, 701-2) begins at the same layer of deposited build materials and end at the same layer of deposited build materials. The measuring module (116) determines the BNV ratio of the first disc (701-1) by computing, for each layer within the build, the ratio of the area of the part (black) at which the heating particles of the powder material to a level that involves fully melting the particles to achieve solidification of the particles as a homogeneous part to the area of the remainder of the build material that is not fused (white). The B/W ratio does not consider other parts that are being printed, and considers the fusing areas of the other parts as "white" area. In the example described here, the pixel count is used to define the area of the part that is the "black" area of the build. In another example, a drop count of printing agent used to cover the area of a layer to be fused or sintered may be used to indicate the "black" area of each layer of the part.

Figure 10:
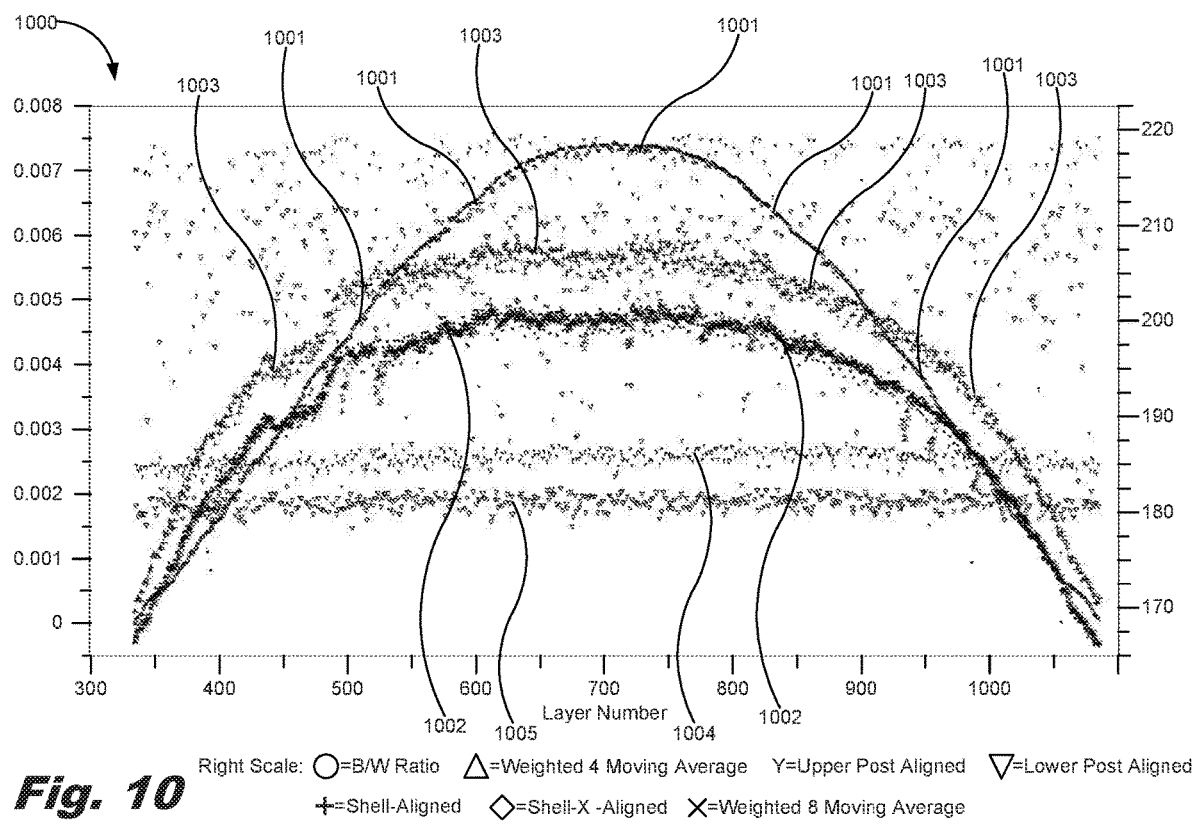
FIG. 10 is a chart depicting B/W ratio values of temperatures in a number of layers of a part, according to an example of the principles described herein.

This B/W ratio is depicted in FIG. 10. FIG. 10 is a chart (1000) depicting B/W ratio values (left y-axis) of temperatures (right y-axis) in a number of layers (x-axis) of a part, according to an example of the principles described herein. The part being analyzed is the first disc (701-1) and the data points for the B/W ratio as measured a priori for the first disc (701-1) is depicted using data points (1001). As depicted in FIG. 10, the BNV ratio values, depicted using circles, follow a trend of increasing black values relative to the white values as the elliptical-shaped, first disc (701-1) is built from approximately layer 330 to a zenith area at approximately layer 710 where the black values follow a trend of decreasing black values relative to the white values until the build of the first disc (701-1) is complete at approximately layer 1095. It is noted that the temperature of the layers of the first disc (701-1) increases with the area of the first disc (701-1) that is being build in that particular layer. Thus, there is a mathematical and physical correlation between the temperature of each of the layers of the first disc (701-1) with the cross-sectional area of the first disc (701-1) in the x, y plane. In one example, a user may be presented with the ability to select a metric for review of the part, and the computing device (200) may preview the results on a sample part. This allows the user to determine how the part may be printed and to anticipate the characteristics of the part.

As depicted in FIG. 10, a post-print thermal image may capture the data points representing the actual temperatures of the first disc (701-1) as indicated by 1002, and the second disc (701-2) as indicated by 1003. The post-print thermal data points (1002, 1003) correlate with the data points (1001) of the B/W ratio of the first disc (701-1) as determined by the measuring module (116). This indicates that the measuring module's (116) use of the B/W ratio is effective in determining the temperatures at each layer of a part and the temperatures within the parts as a whole. The data points (1003) for the second disc (701-2) include temperatures that are relatively higher than the data points (1002) for the first disc (701-1) because the second disc (701-2) experiences less heat drain due to its location further interior to the print zone (700) relative to the first disc (701-1) which is located relatively closer to the perimeter of the print zone (700).

The bounding perimeter ratio analysis may include a blob perimeter that is measured in terms of pixels of the underlying digital image. The bounding perimeter ratio may be computed by dividing with the build area as presented herein in connection with the B/W ratio analysis, and may include selecting a region of interest (ROI) (702) such as, for example, the center of the first disc (701-1). The ROI (702) may include, for example, two pixels (e.g., voxels) located at the center of the first disc (701-1). These two pixels are extracted from the 3D part file (120). The measuring module (116) determines the bounding perimeter ratio of the first disc (701-1) by computing, for each layer within the build, the ratio of the area of the blob perimeter to the area of the remainder of the build material that is not fused.

The chart (1000) of FIG. 10 also includes data points (1004, 1005) for two posts that are included within the build as controls or standards as to what temperature levels may be expected among the parts. These data points (1004, 1005) include an approximately level temperature as would be expected as the same layers of the posts with identical x, y cross-sections and area are placed on top of one another.

Due to inconsistencies in the print zone (700) and because heat loss occurs at the perimeter of the parts (701-1, 701-2), the curves (1001, 1002, 1003) do not match exactly. However, the curves' (1001, 1002, 1003) trending together indicates that the correlation between the B/W ratio and the data points (1001, 1002) confirms that the B/W ratio is a viable method of determining, a priori, the potential for print defects in the part and how to remedy those potential print defects through the adjustment of a number of print parameters such as the amount of printing agents to use in connection with the printing of the part.

In one example, once the measuring module (116) determines the thermal properties and history of the part (701-1, 701-2), the thermal properties and history of the part (701-1, 701-2) when oriented in a different manner and/or placed in a different area of the print zone (700) are a function of the orientation and position of the part within the build. For example, the first disc (701-1) may experience a relatively cooler build being located on a side of the print zone (700) as compared to a relatively hotter build for the second disc (701-2) being located more in the middle of the print zone (700). In this example, a multiplying factor may be applied to the build of the second disc (701-2) to obtain a more accurate build temperature. The measuring module (116) may consider the orientation and position of the part within the build in order to determine the thermal properties and history of the parts (701-1, 701-2). Given objects with orientations that include a major axis that is parallel to the z-axis as depicted in FIGS. 7 through 9 in connection with parts (701-1, 701-2), and if the location of the part is known, the temperature of the part may be accurately predicted. In other words, the temperature of a part is a function of its location within the print zone (700). This model may be generalized to include the effects of irradiation for homogeneous builds, and further generalized to multiple units as provided by the neural network (190) of FIG. 2 where the data points (1004, 1005) for the two posts may be used to encode the unit to unit variance for the same firmware version executed on different 3D printing devices (150).

The measuring module (116) may determine a temperature profile at a plurality of layers of the part by employing a bounding analysis. As used in the present specification and in the appended claims, the term "bounding" is meant to be understood broadly as a boundary around a part defines a minimum part placing distance that minimizes the possibility of neighboring parts within a print bed from bonding to one another during a 3D printing process. In one example, a bounding may also define a minimum part placing distance that minimizes thermal cross-talk with a neighboring part. Further, the part bound for each part defines a shape that individually encloses each of the parts within the batch, and maintains secrecy or confidentiality of the parts within a batch based on a bounding proxy of the part bound.

The print job provided by or created by the user defines how the parts (750) to be printed by the 3D printing device (150) are digitally arranged within a print zone (700) and how they will physically be arranged within the print zone (700) of the 3D printing device (100) when printed. As the parts (750) are prepared by the 3D printing device (100) and other computing devices for printing, the parts (750) may be digitally arranged or packed in the print bed and visualized by the 3D printing device and/or displayed to a user on a display device associated with the computing device (200) and/or the 3D printing device (150). The parts (750) may be digitally arranged within the print zone (700) such that as many parts (750) as possible may be included within the print zone (700) and the print job in an efficient and effective arrangement. For example, the parts (750) may be close enough to one another to minimize any wasted space between the parts, but separated such that the printing of any individual part (750) does not affect the printing of another part (750). A part bound may define how these parts are to be arranged. Further, the part bound (152) may also include a bounding proxy that includes a set of constraints defining the size and other attributes of the part (750). For each part (750) to be printed in a packed build, a bounding proxy may be created. The bounding proxy includes a set of constraints that define the size, shape, orientation, arrangement, and other attributes for the part. The geometric bounding proxies are packed into a print bed in an efficient manner such that the parts are as close together as possible, but not too close to where the printing of one part overlaps the printing of a neighboring part or the printing of one part can negatively affect the printing of the neighboring part.

Because the boundary analysis creates an approximation of the actual shape and dimensions of the part, the computing device (200) is able to determine a number of metrics about the part when determining the temperature profile at a plurality of layers of the part and the part as a whole that may then be reported. These metrics may include, for example, the x, y centroid of the part, the area at each layer of the part, the aspect ratio of the part, the long axis orientation of the part, the perimeter to area ratio of the part such as, for example, whether the part includes circular areas or more complex concavities and convexities, size distribution of a number of interior features of the part, accumulation metrics in the z-direction such as a height of the fusing agent core, high level summary of face color for a 10 millimeter (mm) by 10 mm area of the part, other metrics, and combinations thereof. The boundary analysis executed by the measuring module (116) may also consider fill distribution metrics such as, for example, percent fill of a fusing agent versus an amount of build material (i.e., build powder) over a full height in the y-direction within a region of, for example, 10 mm in height or a percent fill of a fusing agent versus an amount of build material (i.e., build powder) over a full width in the x-direction within a region of, for example, 10 mm in width. These metrics may then be analyzed to determine the expected temperature profile at the plurality of layers of the part and the part as a whole.

In one example, a set of diagnostic parts may be included within the build such as the aforementioned posts defined by the data points (1004, 1005). These diagnostic parts may be printed in layers after the user build content such as the 3D part file (120) that is being monitored. The layers of the diagnostic parts have no customer proprietary content and may be reported in full detail without the fear of revealing what may be user-confidential part information.

The computing device (200) may also include a print agent module (117) to determine an amount of print agent to apply during a build of the part based on the temperature profile determined by the part analysis module (115) and the measuring module (116). As described herein, the printing agents may include active ingredients, a detailing agent (DA), fusing agents, binding agents, sintering agents, other printing agents, and combinations thereof, that may be used to compensate for a rise in temperature among the layers of the part being printed. The printing agents serve as a liquid solution and specifically include a detailing agent that may be selectively applied onto a layer of powder build material where fusing or sintering of the build material is to be reduced, prevented, or otherwise inhibited or altered. The detailing agent may include cooling agents and defusing agents, that serve to create a more definite separation between the powder material that is to be fused or sintered to form the layers of the part and the remainder of the powder material that surrounds the finished parts within the build. In an example, a liquid solution including a mixture of detailing agent and an active ingredient may be selectively applied onto the powder layer. A liquid solution comprising a mixture of one or multiple active ingredients (AI) as solute within a detailing agent (DA) as the solvent, may be applied. Thus, a detailing agent may be deposited to reduce the fusing of particles within a particular area of powdered material in order to create a more definite boundary between the build material that is not to be fused or sintered and the build material that is to be fused or sintered. The print agent module (117) may instruct the 3D printing device to deposit the printing agent based in the thermal profile obtained from the measuring module (116).

The computing device (200) may also include an adjustment module (118) to adjust a process parameter of the build based on the determined temperature profile. The adjustment module (118) may adjust an amount of detailing agent dispensed during the build, adjust a speed of material deposition within the print zone (700), adjust a speed of irradiation of a build material, adjust the intensity of irradiation of the build material, adjust an amount of heat provided to the build material, adjust other print parameters of the 3D printing device (150), and combinations thereof.

In an example, the system (100) may also include a neural network (190) used to assist in the classification of any detected thermal profiles of the part as identified and calculated by the part analysis module (115) and the measuring module (116). A neural network is a network or circuit of neurons such as an artificial neural network, composed of artificial neurons or nodes used for solving artificial intelligence (AI) problems. The connections of the neural network may be modeled as weights. A positive weight reflects an excitatory connection, while negative values mean inhibitory connections. All inputs are modified by a weight and summed in a process referred as a linear combination. Thus, the neural network in this example may learn how detected thermal profiles are classified and autonomously classify any future detected thermal profiles on the basis of what the neural network has learned as the part analysis module (115) and the measuring module (116) is executed. The neural network (190) may autonomously determine what the output of the print agent module (117) and the adjustment module (118) should be in order to reduce or eliminate defects in the parts, and adjust the manner in which the parts are printed using adjusted levels of printing agents and adjustments to the print parameters of the 3D printing device (150). Further, the neural network (190) learns the temperature profiles of a plurality of different parts, and predicts a new temperature profile for a new part based on the learned temperature profiles of a plurality of different parts.

Having described the system (100) including the functions of the computing device (200) and the 3D printing device (150) and their respective subsystems, the process by which the parts may be printed or built will now be described in connection with FIGS. 3 through 6.

Figure 3:
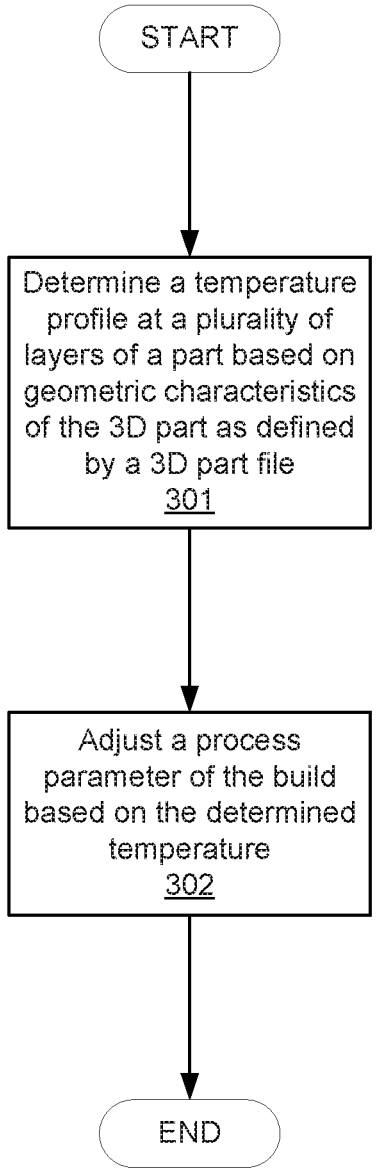
FIG. 3 is a flowchart showing a method of predicting temperature during a build of a 3D part.

FIG. 3 is a flowchart showing a method (300) of predicting temperature during a build of a 3D part. The method (300) may include determining (block 301) a temperature profile at a plurality of layers of a part based on geometric characteristics of the 3D part as defined by a 3D part file. Block 301 may be achieved through execution of the part analysis module (115). The method (300) may also include executing the measuring module (116) to adjust (block 302) a process parameter of the build based on the determined temperature.

Figure 4:
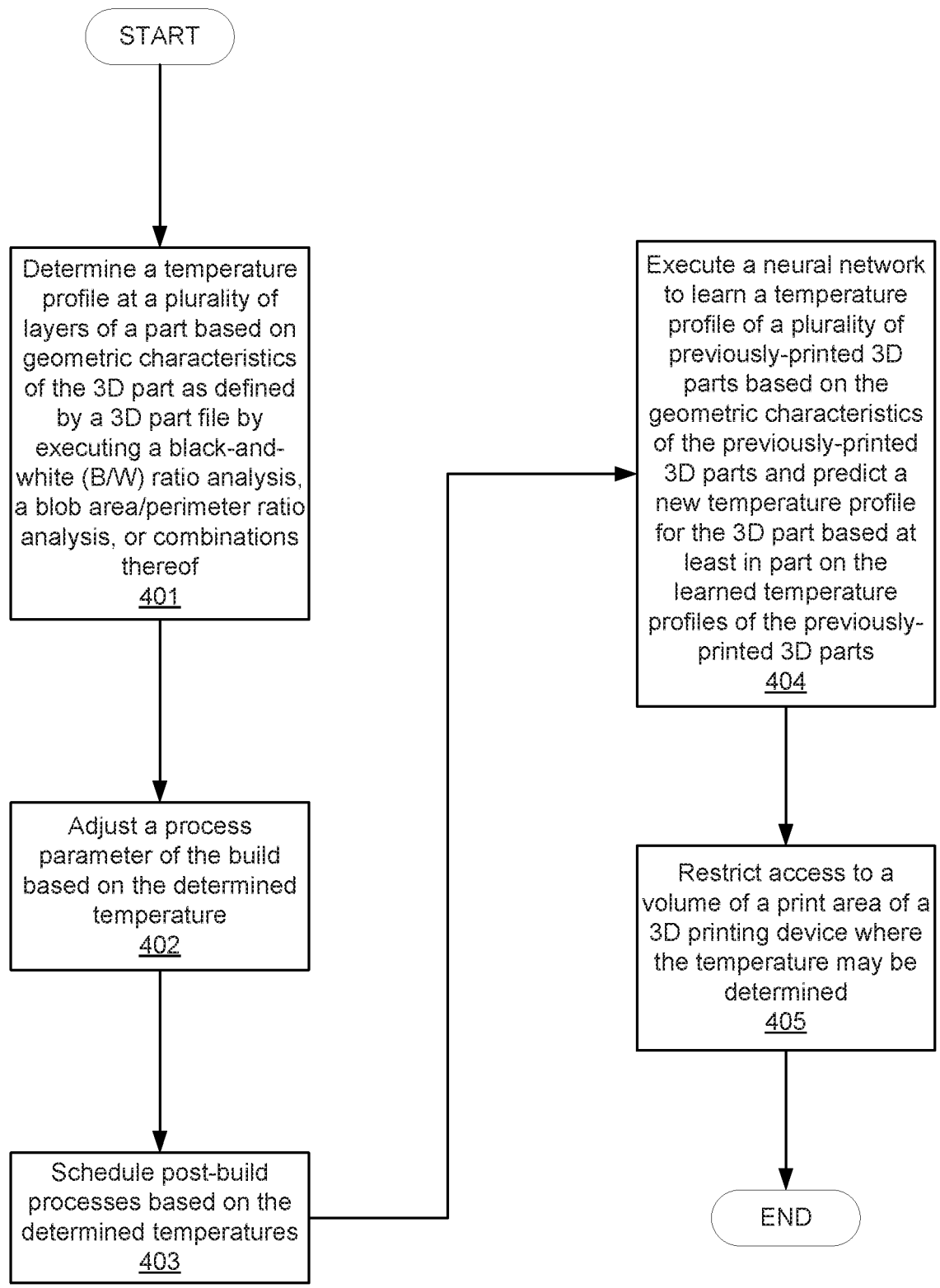
FIG. 4 is a flowchart showing a method of predicting temperature during a build of a 3D part.

FIG. 4 is a flowchart showing a method (400) of predicting temperature during a build of a 3D part. The method (400) may include determining (block 401) a temperature profile at a plurality of layers of a part based on geometric characteristics of the 3D part as defined by a 3D part file by executing a black-and-white (B/W) ratio analysis, a blob area/perimeter ratio analysis, or combinations thereof. Block 401 may be achieved through execution of the part analysis module (115). The method (400) may also include executing the measuring module (116) to adjust (block 402) a process parameter of the build based on the determined temperature.

A number of post-build processes may be scheduled (block 403) based on the determined temperatures. The post-build may include, for example, sanding, sand blasting, milling, tumbling, varnishing, dyeing, cutting, melting, other post-printing processes, or combinations thereof. Further, a neural network (190) may be executed to learn (block 404) a temperature profile of a plurality of previously-printed 3D parts based on the geometric characteristics of the previously-printed 3D parts, and predict a new temperature profile for the 3D part based at least in part on the learned temperature profiles of the previously-printed 3D parts.

The method (400) of FIG. 4 may include restricting (block 405) access to a volume of a print area of a 3D printing device (150) where the temperature may be determined. The part analysis module (115) may also restrict access to a volume of a print area or print zone of the 3D printing device (150) where the temperature of the layers of the part and the part as a whole is being determined. In this example, the part may be undergoing a build or may have completed a build, but the computing device (200) may be requesting metrics from the 3D printing device regarding the temperatures of the part. Thus, the part analysis module (115) may lock a user out of access to the at least a portion of the print zone in order for metrics to be obtained.

Figure 5:
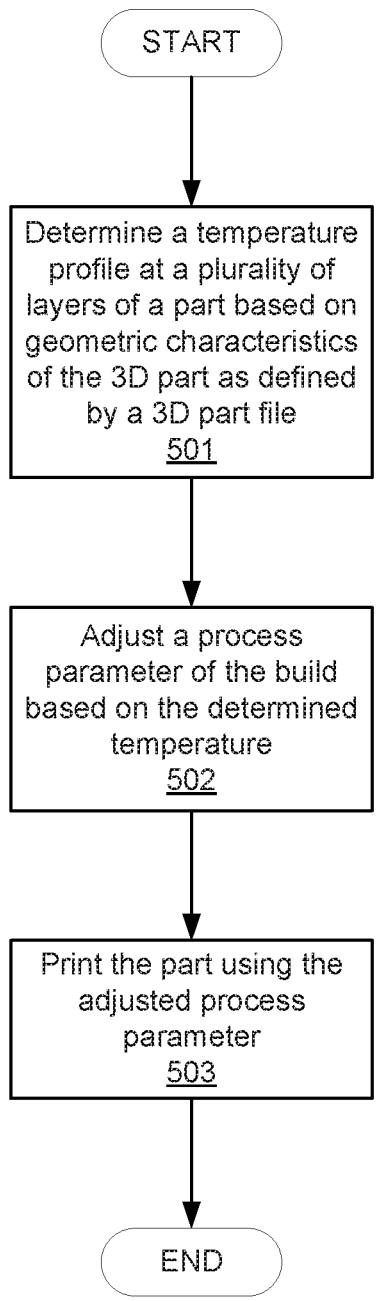
FIG. 5 is a flowchart showing a method of predicting temperature during a build of a 3D part.

FIG. 5 is a flowchart showing a method (500) of predicting temperature during a build of a 3D part. The method (500) of FIG. 5 may include determining (block 501) a temperature profile at a plurality of layers of a part based on geometric characteristics of the 3D part as defined by a 3D part file (120). At least one process parameter may be adjusted (block 502) of the build based on the determined temperature. The method (500) may also include printing (block 503) the part using the adjusted process parameter.

Figure 6:
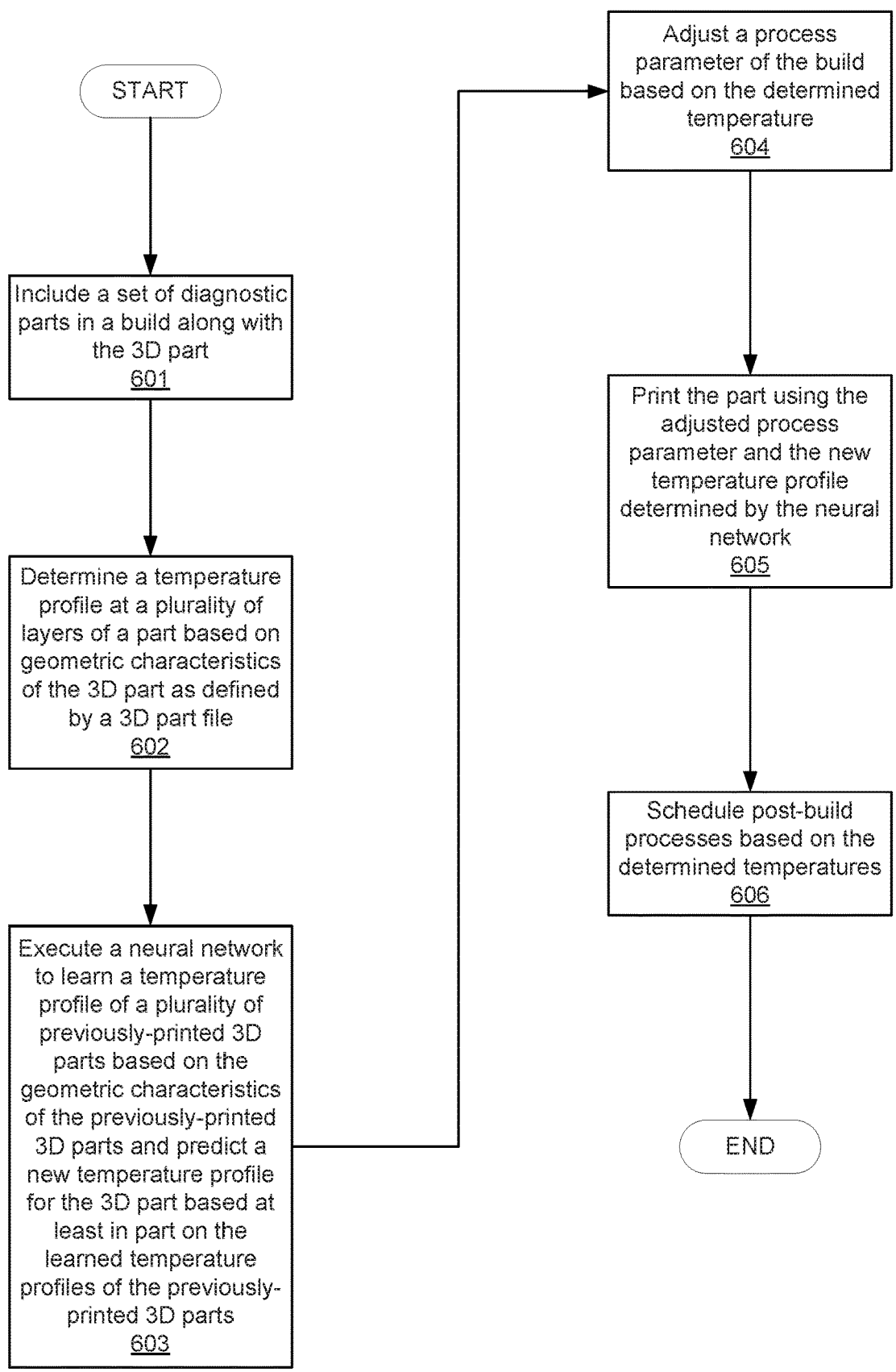
FIG. 6 is a flowchart showing a method of predicting temperature during a build of a 3D part.

FIG. 6 is a flowchart showing a method (600) of predicting temperature during a build of a 3D part. The method (600) of FIG. 6 may include including (block 601) a set of diagnostic parts such as, for example, the two posts defined by the data points (1004, 1005), within the build along with the 3D part that is to be printed as requested by the user. The method (500) may also include determining (block 602) a temperature profile at a plurality of layers of a part based on geometric characteristics of the 3D part as defined by a 3D part file (120). The neural network (190) may be executed (block 603) to learn the temperature profile of a plurality of previously-printed 3D parts based on the geometric characteristics of the previously-printed 3D parts and predict a new temperature profile for the 3D part based at least in part on the learned temperature profiles of the previously-printed 3D parts.

At least one process parameter may be adjusted (block 604) of the build based on the determined temperature. The method (600) may also include printing (block 503) the part using the adjusted process parameter and the new temperature profile determined by the neural network (190). A number of post-build processes may be scheduled (block 606) based on the determined temperatures of the part and using the output of the neural network (190).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the computing device (200), he 3D printing device (150), other programmable data processing apparatus, or combinations thereof, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods of predicting temperature during a build of a three-dimensional (3D) part including determining a temperature profile at a plurality of layers of a part based on geometric characteristics of the 3D part as defined by a 3D part file, and adjusting a process parameter of the build based on the determined temperature.

Though the systems and methods described herein may be used to detect potential failures in parts before they are printed, the methods and systems may also be used to adjust printing agent deposition instructions at the 3D printing device (150), adjust applications of irradiation and heat to the layers of the parts during the build, determine a temperature profile of a part based on parts printed previously and analyzed by the neural network, restrict access to a volume of a print area of a 3D printing device where the temperature may be determined, and schedule post-build processes based on the determined temperatures, and other purposes.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of predicting temperature during a build of a three-dimensional (3D) part, the method comprising:
   determining a temperature profile at a plurality of layers of a part based on at least one geometric characteristic of the 3D part as defined by a 3D part file, wherein the temperature profile is determined by executing either a black-and-white (B/W) ratio analysis, a bounding perimeter ratio analysis, or combinations thereof; and
   adjusting a process parameter of the build based on the temperature profile.

2. The method of claim 1, comprising scheduling post-build processes based on the temperature profile.

3. The method of claim 1, wherein adjusting the process parameter of the build comprises adjusting an amount of detail agent dispensed during the build, adjusting a speed of material deposition, adjusting a speed of irradiation of a build material, adjusting the intensity of irradiation of the build material, adjusting an amount of heat provided to the build material, or combinations thereof.

4. The method of claim 1, comprising executing a neural network to:
   learn a temperature profile for each of a of a plurality of previously-printed 3D parts based on the at least one geometric characteristic of the plurality of previously-printed 3D parts; and
   predict a new temperature profile for the 3D part based at least in part on at least one of the temperature profiles of the previously-printed 3D parts.

5. The method of claim 1, comprising restricting access to a volume of a print area of a 3D printing device where the temperature profile may be determined.

6. A non-transitory computer readable medium storing computer usable program code embodied therewith to, when executed by a processor, predicts a temperature profile during a build of a three dimensional (3D) part, the medium comprising:
   determine a temperature profile, wherein the temperature profile is determined by executing either a black-and-white (B/W) ratio analysis, a bounding perimeter ratio analysis, or combinations thereof, at a plurality of layers of a part based on geometric characteristics of the 3D part as defined by a 3D part file; and
   adjust a process parameter of the build based on the temperature profile.

7. The computer readable medium of claim 6 further comprising, schedule post-build processes based on the temperature profile.

8. The computer readable medium of claim 6 further comprising, execute a neural network to:
learn the temperature profile of the 3D part; and
predict a new temperature profile for a new 3D part.

9. The computer readable medium of claim 6 further comprising, including a set of diagnostic parts in a build along with the 3D part.

10. A system for predicting temperature during a build of a three-dimensional (3D) part, the system comprising:
a part analysis module to determine a number of geometric characteristics of a 3D part based on data within a 3D part file;
a measuring module to determine a temperature profile at a plurality of layers of the part based on at least one of the geometric characteristics of the 3D part, wherein the temperature profile is determined by executing either a black-and-white (B/W) ratio analysis, a bounding perimeter ratio analysis, or combinations thereof; and
an adjustment module to adjust a process parameter of a build based on the temperature profile.

11. The system of claim 10, further comprising:
a neural network configured to:
learn the temperature profiles of a plurality of different 3D parts; and
predict a new temperature profile for a new 3D part based on the temperature profiles of the plurality of different 3D parts.

12. The system of claim 10, wherein the measuring module determines the temperature profile further based on a location of the part within a print area of a 3D printing device.

13. The system of claim 10, comprising:
a detailing agent (DA) module to determine an amount of a DA to apply during the build of the 3D part based on the temperature profile.

* * * * *